United States Patent
Favre

(10) Patent No.: US 7,028,569 B2
(45) Date of Patent: Apr. 18, 2006

(54) PISTON, IN PARTICULAR FOR SAMPLING VALVE

(76) Inventor: Pascal Favre, Ch. des Condémines 5, Préverenges (CH), 1028

(*) Notice: Subject to any disclaimer, the term of this patent is extended or adjusted under 35 U.S.C. 154(b) by 359 days.

(21) Appl. No.: 10/276,746

(22) PCT Filed: May 18, 2001

(86) PCT No.: PCT/CH01/00309

§ 371 (c)(1), (2), (4) Date: Apr. 8, 2003

(87) PCT Pub. No.: WO01/88416

PCT Pub. Date: Nov. 22, 2001

(65) Prior Publication Data

US 2003/0145669 A1 Aug. 7, 2003

(30) Foreign Application Priority Data

May 19, 2000 (CH) .............................................. 1015/00

(51) Int. Cl.
*F16H 27/02* (2006.01)

(52) U.S. Cl. ...................................... 74/89.37; 74/89.41
(58) Field of Classification Search ................ 74/89.37, 74/89.38, 89.4, 89.41

See application file for complete search history.

(56) References Cited

U.S. PATENT DOCUMENTS

| | | | | | |
|---|---|---|---|---|---|
| 2,394,687 | A | * | 2/1946 | Hein | 604/219 |
| 3,589,677 | A | * | 6/1971 | Segers | 251/175 |
| 3,615,241 | A | * | 10/1971 | Low et al. | 422/81 |
| 3,747,479 | A | * | 7/1973 | Nightingale et al. | 92/203 |
| 3,991,616 | A | * | 11/1976 | Stahli | 73/863.32 |
| 5,152,678 | A | * | 10/1992 | Zeck | 417/401 |
| 5,536,471 | A | * | 7/1996 | Clark et al. | 422/63 |

FOREIGN PATENT DOCUMENTS

| | | |
|---|---|---|
| CH | 364670 A | 9/1962 |
| DE | 3109350 A | 4/1982 |

* cited by examiner

*Primary Examiner*—David M. Fenstermacher
(74) *Attorney, Agent, or Firm*—Clifford W. Browning; Woodard, Emhardt, Moriarty McNett & Henry LLP

(57) ABSTRACT

The invention concerns a piston wherein the mobile screw (2) is engaged in the bolt (8) integral with the mobile assembly (1). It is provided with a cylindrical axial housing (10) wherein is engaged the rod (7) integral at its front end with the expander assembly (4). At the end of its front travel, the rod is retained by its flange (19) pressed on the stop (11) such that the expanding ring (5) is compressed by the thrust of the piston body (3) and causes the flexible envelope (6) to expand.

12 Claims, 2 Drawing Sheets

PISTON, IN PARTICULAR FOR SAMPLING VALVE

The present invention relates to a piston, in particular for a draw-off valve.

In certain technical sectors, in particular in the chemical industry, there is a requirement for valves having to equip draw-off pipes connected to receptacles containing liquids or powders. These valves are necessary, for example, for taking samples during manufacturing processes. The patent CH 637456 describes an implementation of a piston equipping such a valve. This piston comprises a piston body covered externally with an extensible casing, a displacement screw provided with rotational driving means and cooperating with a nut immovably attached to the piston body for displacement thereof in response to the rotations of the screw, and a dilating device linked to the piston and causing, at the limit of travel, a dilation of the casing.

Although the construction described in this patent meets the requirements to a certain extent, it turned out that it had an excessive complexity and manufacturing difficulties. Moreover, it turned out that the external casing 18, made of a deformable material, of this piston buckles when the piston is compressed at the forward limit of travel, which leads to losses of sealing.

The aim of the present invention is therefore to provide improvements to a piston such as the one forming the subject of the aforementioned patent.

With this aim, the present invention relates to a piston of the type described above and in which the dilating device comprises a dilating disk and a rod having one end immovably attached to the disk, the screw having on the one hand a longitudinal housing in which the rod is fitted and on the other hand at its front end a limit stop which cooperates at the limit of travel with a collar of the rod situated at its back end, so as to cause a squeezing of the dilating disk against the end of the piston body and a localised radial expansion of the casing.

According to one embodiment, the dilating device comprises an expansible ring disposed between the end of the piston body and the dilating disk. The dilating disk can have to that effect a tubular extension fitted in an internal recess in the piston body, at its front end so that the expansion ring is entirely contained between radial or axial surfaces of the piston body, the dilating disk and the casing.

The expansion ring can be made of elastomer or rubber, or consist of a ring-block in two parts placed next to one another with a tapered contact surface, the flexible casing capable of being produced in Teflon or any other elastic material (steel or plastic).

The casing of the piston can comprise a tubular part adjusted to the diameter of the piston body, a front extreme part in disk form adjacent to the dilating disk and at its back end an internal retaining rim, fitted in a groove in the piston body.

The limit stop can be constituted by an annular component screwed at the input of the housing in the screw.

Means can be provided for guiding the piston longitudinally in a tubular valve body.

According to a variant embodiment, the immovable attachment of the casing and the piston body is achieved by screwing the back end of the casing onto the piston body.

There will be described below, by way of example, two embodiments of the object of the invention, depicted by the accompanying drawing, in which.

Figure 1:
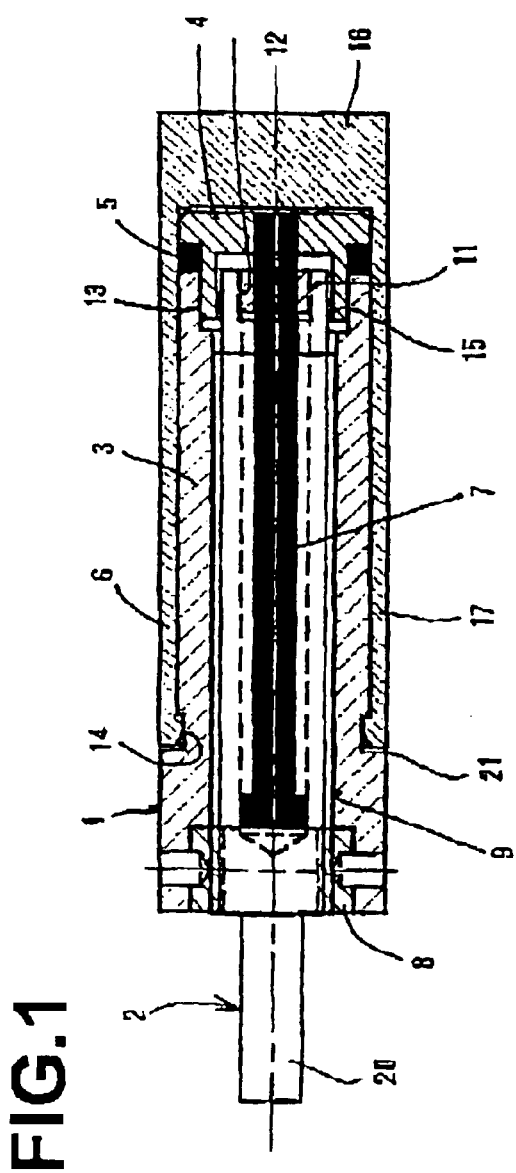
FIG. 1 is a longitudinal sectional view of a first embodiment of the piston in the back position.
Figure 2:
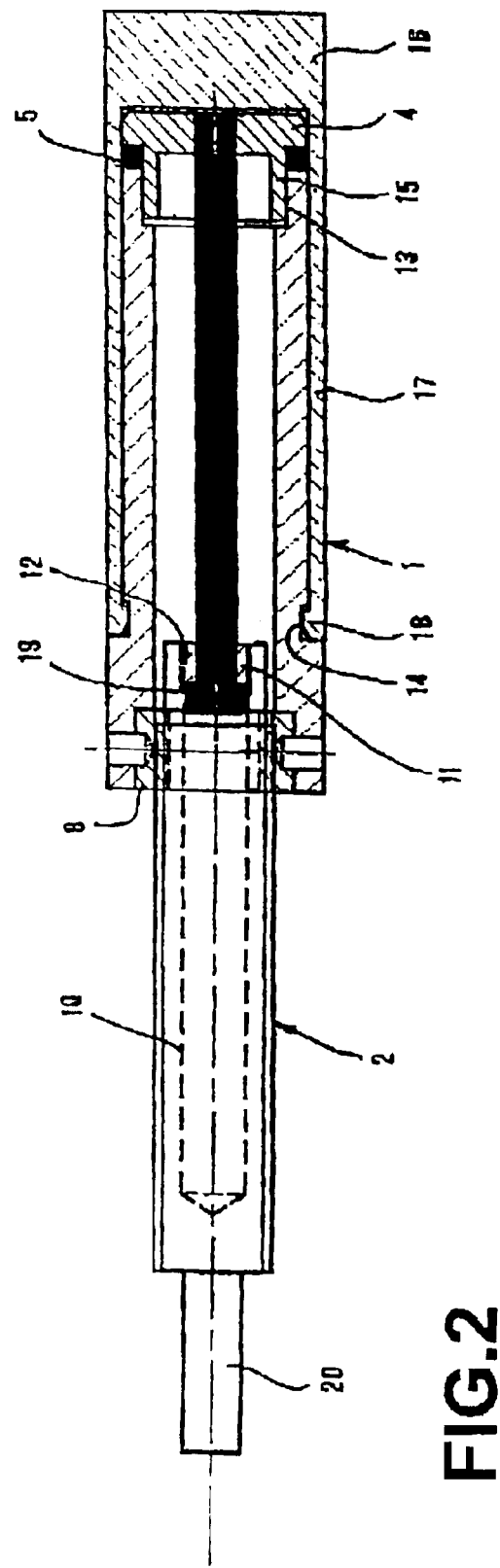
FIG. 2 is a view similar to FIG. 1 showing the piston in the forward position.

The piston depicted in FIGS. 1 and 2 consists of two main parts: a movable assembly 1 and a displacement screw 2. The movable assembly comprises a piston body 3, a dilating disk 4, an expansion ring 5, a flexible casing 6, a rod 7 and a nut 8. As regards the displacement screw 2, this is formed from a cylindrical component with an external thread 9 corresponding to the internal thread of the nut 8 and a longitudinal housing 10 which extends axially into the screw from its front end over part of its length and has a segment 12 with an internal thread at its front end. An annular limit stop 11 is screwed into this internal thread.

The piston body 3 is preferably a metal component. It has a tubular shape with a smooth internal bore, having a recess at its back end, in which the nut 8 is fixed, and a second recess 13 at its front end.

The external face of the piston body 3 is also cylindrical with a groove 14 in the vicinity of its back end, the diameter of the back part being slightly larger than that of the front part.

The dilating disk 4 is provided with a cylindrical wall 15 on its back side, the dimensions of this wall being such that they allow sliding of the disk in the recess 13, causing axial compression of the expansion ring 5 and the swelling thereof.

The flexible casing 6 is for example made of Teflon. Its thick bottom 16 covers the front face of the dilating disk 4 and its cylindrical thin wall 17 closely covers the periphery of the dilating disk 4, the external face of the ring 5 and that of the piston body 3 as far as the groove 14. An internal rim 18 of the casing 6 is fitted in the groove 14 so as to immovably attach it to the piston body 3. As depicted in FIG. 1, the length of this rim 18 is less than the width of the groove 14, so that, in the back position of the piston, a clearance remains between the back end of the casing 16 and the front shoulder 21 of the back part of the piston body. This clearance corresponds substantially to the reduction in thickness of the ring 5 when it is compressed at the limit of travel of the piston, so that the flexible casing undergoes practically no longitudinal compression and thus remains constantly resting against the front face of the dilating disk 4. Of course, the immovable attachment of the flexible casing 6 to the body of the piston can also be achieved by any other means equivalent to the rim/groove clipping, like for example by means of an open band captive on the one hand in the groove in the piston and on the other hand in a channel in the flexible casing, or also by screwing through one or more oblong holes in the casing.

Finally the rod 7 is fixed at its front end by screwing, pressing or welding in a central opening of the disk 4, and has at its back end a collar 19 adjusted with clearance to the bore of the housing 10 in the screw 2.

Mounting and operation of the piston result from a comparison between FIGS. 1 and 2.

The movable assembly 1 slides in a tubular support, for example a cylindrical body of a draw-off valve, while the screw 2 is supported and guided rotationally by means of its axial extension 20, in a fixed end fitting (not depicted) immovably attached to the valve body. This extension 20 also serves as a fixing means for a flywheel, a crank or any other rotational driving member.

From the back extreme position of FIG. 1, a rotation of the screw 2 leads to a displacement of the assembly 1 towards the front. It should be noted that means can be provided for preventing a rotation of the piston, for example screws for clamping the nut 8 in its internal thread can have a protruding head, sliding in a longitudinal channel in the valve body.

The final position of the movable assembly 1 will be reached when, as seen in FIG. 2, the collar 19 of the rod 7 comes to rest on the limit stop 11. From that time on, the rotation of the screw 2 leads to a relative movement between the piston body 3 and the dilating disk 4 with compression of the ring 5, which is held in on three of its four faces and can swell only radially, leading to an expansion of the adjoining part of the casing 6. The seal between the piston and the valve body is thus made perfectly impervious while during displacement the flexible casing could slide freely.

Figure 3:
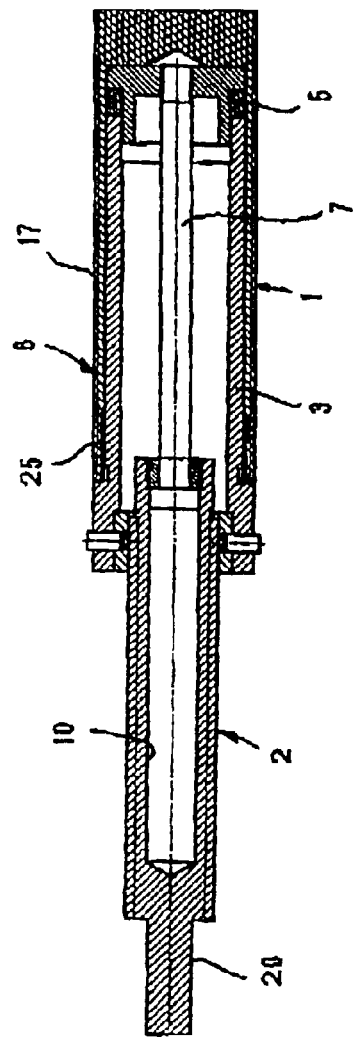
FIG. 3 is a longitudinal sectional view of a second embodiment of the piston in the forward position.

The second embodiment depicted in FIG. 3 is distinguished from the first embodiment described above in that the immovable attachment of the flexible casing 6 to the piston body 3 is achieved by screwing 25 the back end of the internal wall of the flexible casing 6 onto the piston body. According to a variant, not depicted in the drawing, of this embodiment, the end of the flexible casing 6 can be screwed not directly onto the piston body 3, but onto a sleeve or band added on and able to slide longitudinally along the piston body.

Various modifications of the construction described are possible without departing from the scope of the invention. Thus the flexible casing 6, instead of being made of Teflon or some other plastic material having the same characteristics, could also be made of a pliable metal, for example tantalum.

The ring 5 could be formed from two metal annular components having complementary tapered profiles and constitute a ring block.

Similarly, the expansion ring 5 can be replaced by a tapered conformation of the back face of the dilating disk 4 cooperating with a complementary tapered conformation of the front face of the head of the piston, the head of the piston having longitudinal slots, so as to allow its diametral expansion when its tapered face comes to rest against the tapered surface of the dilating disk.

For the rod, the piston body and the dilating disk, stainless steel will preferably be used.

The construction described has a number of advantages.

The Teflon or pliable metal casing is entirely supported by rigid parts of the movable assembly so that it withstands pressure perfectly.

The number of components to be assembled is reduced. Welding operations can be eliminated.

The replacement of an intermediate tube by the rod fitted in the housing in the screw simplifies the construction, machining of the elements and assembly. This arrangement also improves the reliability of the piston.

Finally, it should be noted that the expansible ring with rectangular profile which is described could also, if need be, be replaced by a toric-shaped ring (an O-ring).

What is claimed is:

1. A piston, for a draw-off valve, comprising a piston body covered externally with an extensible casing, a displacement screw provided with rotational driving means and cooperating with a nut immovably attached to the piston body for displacement thereof in response to the rotations of the screw, and a dilating device linked to the piston and causing, at the limit of travel, a dilation of the casing, wherein the dilating device comprises a dilating disk and a rod having one end immovably attached to the disk, and wherein the screw has on the one hand a longitudinal housing in which the rod is fitted and on the other hand at its front end a limit stop which cooperates at the limit of travel with a collar of the rod situated at its back end, so as to cause a squeezing of the dilating disk against the end of the piston body and a radial expansion of said dilating device.

2. A piston according to claim 1, wherein the dilating device comprises an expansible ring disposed between the end of the piston body and the dilating disk.

3. A piston according to claim 2, wherein the dilating disk has a tubular extension fitted in an internal recess in the piston body, at its front end so that the expansion ring is entirely contained between radial or axial surfaces of the piston body, the dilating disk and the casing.

4. A piston according to claim 3, wherein the expansion ring is made of elastomer or rubber.

5. A piston according to claim 3, wherein the expansion ring is a ring-block in two parts placed next to one another with a tapered contact surface.

6. A piston according to claim 1, wherein the flexible casing is made of Teflon.

7. A piston according to claim 1, wherein the casing comprises a tubular part adjusted to the diameter of the piston body, a front extreme part in disk form adjacent to the dilating disk and at its back end an internal retaining rim, fitted in a groove in the piston body.

8. A piston according to claim 1, wherein the casing comprises a tubular part adjusted to the diameter of the piston body, a front extreme part in disk form adjacent to the dilating disk, and wherein the immovable attachment of the casing and the piston body is achieved by screwing the back end of the casing onto the piston body.

9. A piston according to claim 7, wherein the flexible casing is closely supported by the dilating disk and by the piston body.

10. A piston according to claim 8, wherein the flexible casing is closely supported by the dilating disk and by the piston body.

11. A piston according to claim 1, wherein the limit stop is an annular component screwed at the input of the housing in the screw.

12. A piston according to claim 1, wherein means are provided for guiding the piston longitudinally in a tubular valve body.

* * * * *